(12) United States Patent
Feng et al.

(10) Patent No.: US 11,372,554 B1
(45) Date of Patent: Jun. 28, 2022

(54) CACHE MANAGEMENT SYSTEM AND METHOD

(71) Applicant: EMC IP Holding Company, LLC, Hopkinton, MA (US)

(72) Inventors: Changyu Feng, Beijing (CN); Henry Austin Spang, IV, Hopkinton, MA (US); Jian Gao, Beijing (CN); Xinlei Xu, Beijing (CN); Ruiyong Jia, Beijing (CN); Yousheng Liu, Beijing (CN)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 158 days.

(21) Appl. No.: 15/661,688

(22) Filed: Jul. 27, 2017

(51) Int. Cl.
*G06F 3/06* (2006.01)
*G06F 12/128* (2016.01)
*G06F 12/0871* (2016.01)

(52) U.S. Cl.
CPC ............ *G06F 3/0617* (2013.01); *G06F 3/067* (2013.01); *G06F 3/0665* (2013.01); *G06F 3/0689* (2013.01); *G06F 12/0871* (2013.01); *G06F 12/128* (2013.01); *G06F 2212/604* (2013.01); *G06F 2212/621* (2013.01)

(58) Field of Classification Search
CPC ..... G06F 3/0617; G06F 3/067; G06F 12/0871
See application file for complete search history.

(56) References Cited

U.S. PATENT DOCUMENTS

| 7,281,097 | B1* | 10/2007 | Lawson ................ G06F 3/0613 711/154 |
| 8,688,878 | B1* | 4/2014 | Dolan ..................... G06F 3/061 710/33 |
| 9,298,493 | B1* | 3/2016 | Harel ........................ G06F 9/46 |
| 2004/0260748 | A1* | 12/2004 | Springer, Sr. ........... G06F 9/505 709/200 |
| 2010/0191876 | A1* | 7/2010 | Muppirala ............ G06F 3/0613 710/39 |
| 2011/0119679 | A1* | 5/2011 | Muppirala ............ G06F 3/0611 718/105 |
| 2012/0143992 | A1* | 6/2012 | Salamatov .............. H04L 67/10 709/219 |
| 2012/0203986 | A1* | 8/2012 | Strasser ................ G06F 3/0611 711/158 |
| 2013/0166874 | A1* | 6/2013 | Auernhammer ...... G06F 12/122 711/204 |
| 2017/0192921 | A1* | 7/2017 | Wang ........................ G06F 9/46 |
| 2017/0286337 | A1* | 10/2017 | Wang ...................... G06F 13/36 |

* cited by examiner

*Primary Examiner* — Sanjiv Shah
*Assistant Examiner* — Alexander J Yoon
(74) *Attorney, Agent, or Firm* — Brian J. Colandreo; Mark H. Whittenberger; Holland & Knight LLP

(57) ABSTRACT

A method, computer program product, and computing system for receiving one or more IO requests at a cache system for storing content in a storage array. A maximum number of concurrent backend IO requests may be associated with the storage array based upon, at least in part, a change in size of the storage array. The one or more TO requests may be flushed to the storage array via one or more backend IO requests from the cache system based upon, at least in part, the maximum number of concurrent backend IO requests associated with the storage array.

22 Claims, 13 Drawing Sheets

CACHE MANAGEMENT SYSTEM AND METHOD

BACKGROUND

Storing and safeguarding electronic content may be beneficial in modern business and elsewhere. Accordingly, large data storage systems may be utilized to protect such electronic content, wherein such large data storage systems may be configured as data storage arrays to provide a high level of data availability. Such large data storage systems may utilize cache memory systems to expedite the storage/retrieval of data within/from these data storage arrays by multiple hosts.

SUMMARY OF DISCLOSURE

In one example implementation, a computer-implemented method is executed on a computing device and may include but is not limited to receiving, at the computing device, one or more IO requests at a cache system for storing content in a storage array. A maximum number of concurrent backend IO requests may be associated with the storage array based upon, at least in part, a change in size of the storage array. The one or more IO requests may be flushed via one or more backend IO requests from the cache system to the storage array based upon, at least in part, the maximum number of concurrent backend IO requests associated with the storage array.

One or more of the following example features may be included. The one or more backend IO requests may be flushed from the cache system via one or more cores of one or more multi-core processors. One or more credits may be generated for the storage array based upon, at least in part, the maximum number of concurrent backend IO requests associated with the storage array. The one or more credits may be distributed to at least one core of the one or more cores. The one or more credits may represent one or more concurrent backend IO requests. At least one IO request of the one or more IO requests may be flushed via at least one concurrent backend IO request of the one or more concurrent backend IO requests from the at least one core based upon, at least in part, the one or more credits distributed to the at least one core. The size of the storage array may be determined to have increased. A revised maximum number of concurrent backend IO requests may be associated with the storage array based upon, at least in part, the increase in the size of the storage array. One or more additional credits may be generated based upon, at least in part, the maximum number of concurrent backend TO requests associated with the storage array. A request for an additional credit may be received from at least one core of the one or more cores and at least one additional credit of the one or more additional credits may be distributed to the at least one core.

The size of the storage array may be determined to have decreased. A revised maximum number of concurrent backend IO requests may be associated with the storage array based upon, at least in part, the decrease in the size of the storage array. A maximum number of credits may be determined for the storage array based upon, at least in part, the maximum number of concurrent backend IO requests associated with the storage array. A current number of credits may be determined for the storage array. An indication may be received that at least one core of the one or more cores has flushed an IO request. When the current number of credits exceeds the maximum number of credits, at least one credit may be removed from the at least one core from which the indication was received and/or the current number of credits for the storage array may be decremented by the number of credits removed. When the current number of credits does not exceed the maximum number of credits, the at least one credit may be released back to the at least one core for flushing additional IO requests of the one or more IO requests. At least one credit may be released back to at least core of the one or more cores for flushing additional IO requests of the one or more IO requests. A request from at least one core of the one or more cores may be received for an additional credit when the at least one core has an insufficient number of credits to flush one or more IO requests and an additional credit may be distributed to the at least one core from another core of the one or more cores.

In another example implementation, a computer program product resides on a computer readable medium that has a plurality of instructions stored on it. When executed by a processor, the instructions cause the processor to perform operations that may include but are not limited to receiving one or more IO requests at a cache system for storing content in a storage array. A change in a size of the storage array is determined. A maximum number of concurrent backend IO requests may be associated with the storage array based upon, at least in part, a change in size of the storage array. The one or more IO requests may be flushed via one or more backend IO requests from the cache system to the storage array based upon, at least in part, the maximum number of concurrent backend IO requests associated with the storage array.

One or more of the following examples features may be included. The one or more backend IO requests may be flushed from the cache system via one or more cores of one or more multi-core processors. One or more credits may be generated for the storage array based upon, at least in part, the maximum number of concurrent backend IO requests associated with the storage array. The one or more credits may be distributed to at least one core of the one or more cores. The one or more credits may represent one or more concurrent backend IO requests. At least one IO request of the one or more IO requests may be flushed via at least one concurrent backend IO request of the one or more concurrent backend IO requests from the at least one core based upon, at least in part, the one or more credits distributed to the at least one core. The size of the storage array may be determined to have increased. A revised maximum number of concurrent backend IO requests may be associated with the storage array based upon, at least in part, the increase in the size of the storage array. One or more additional credits may be generated based upon, at least in part, the maximum number of concurrent backend IO requests associated with the storage array. A request for an additional credit may be received from at least one core of the one or more cores and at least one additional credit of the one or more additional credits may be distributed to the at least one core.

The size of the storage array may be determined to have decreased. A revised maximum number of concurrent backend IO requests may be associated with the storage array based upon, at least in part, the decrease in the size of the storage array. A maximum number of credits may be determined for the storage array based upon, at least in part, the maximum number of concurrent backend IO requests associated with the storage array. A current number of credits may be determined for the storage array. An indication may be received that at least one core of the one or more cores has flushed an IO request. When the current number of credits exceeds the maximum number of credits, at least one credit may be removed from the at least one core from which the indication was received and/or the current number of credits for the storage array may be decremented by the number of credits removed. When the current number of credits does not exceed the maximum number of credits, the at least one credit may be released back to the at least one core for flushing additional IO requests of the one or more IO requests. At least one credit may be released back to at least core of the one or more cores for flushing additional IO requests of the one or more IO requests. A request from at least one core of the one or more cores may be received for an additional credit when the at least one core has an insufficient number of credits to flush one or more IO requests and an additional credit may be distributed to the at least one core from another core of the one or more cores.

In another example implementation, a computing system includes at least one processor and at least one memory architecture coupled with the at least one processor, wherein the computing system is configured to perform operations including but not limited to receiving one or more IO requests at a cache system for storing content in a storage array. A change in a size of the storage array is determined. A maximum number of concurrent backend IO requests may be associated with the storage array based upon, at least in part, a change in size of the storage array. The one or more IO requests may be flushed via one or more backend IO requests from the cache system to the storage array based upon, at least in part, the maximum number of concurrent backend IO requests associated with the storage array.

One or more of the following example features may be included. The one or more backend IO requests may be flushed from the cache system via one or more cores of one or more multi-core processors. One or more credits may be generated for the storage array based upon, at least in part, the maximum number of concurrent backend IO requests associated with the storage array. The one or more credits may be distributed to at least one core of the one or more cores. The one or more credits may represent one or more concurrent backend IO requests. At least one IO request of the one or more IO requests may be flushed via at least one concurrent backend IO request of the one or more concurrent backend IO requests from the at least one core based upon, at least in part, the one or more credits distributed to the at least one core. The size of the storage array may be determined to have increased. A revised maximum number of concurrent backend IO requests may be associated with the storage array based upon, at least in part, the increase in the size of the storage array. One or more additional credits may be generated based upon, at least in part, the maximum number of concurrent backend IO requests associated with the storage array. A request for an additional credit may be received from at least one core of the one or more cores and at least one additional credit of the one or more additional credits may be distributed to the at least one core.

The size of the storage array may be determined to have decreased. A revised maximum number of concurrent backend IO requests may be associated with the storage array based upon, at least in part, the decrease in the size of the storage array. A maximum number of credits may be determined for the storage array based upon, at least in part, the maximum number of concurrent backend IO requests associated with the storage array. A current number of credits may be determined for the storage array. An indication may be received that at least one core of the one or more cores has flushed an IO request. When the current number of credits exceeds the maximum number of credits, at least one credit may be removed from the at least one core from which the indication was received and/or the current number of credits for the storage array may be decremented by the number of credits removed. When the current number of credits does not exceed the maximum number of credits, the at least one credit may be released back to the at least one core for flushing additional IO requests of the one or more IO requests. At least one credit may be released back to at least core of the one or more cores for flushing additional IO requests of the one or more IO requests. A request from at least one core of the one or more cores may be received for an additional credit when the at least one core has an insufficient number of credits to flush one or more IO requests and an additional credit may be distributed to the at least one core from another core of the one or more cores.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DETAILED DESCRIPTION

Figure 1:
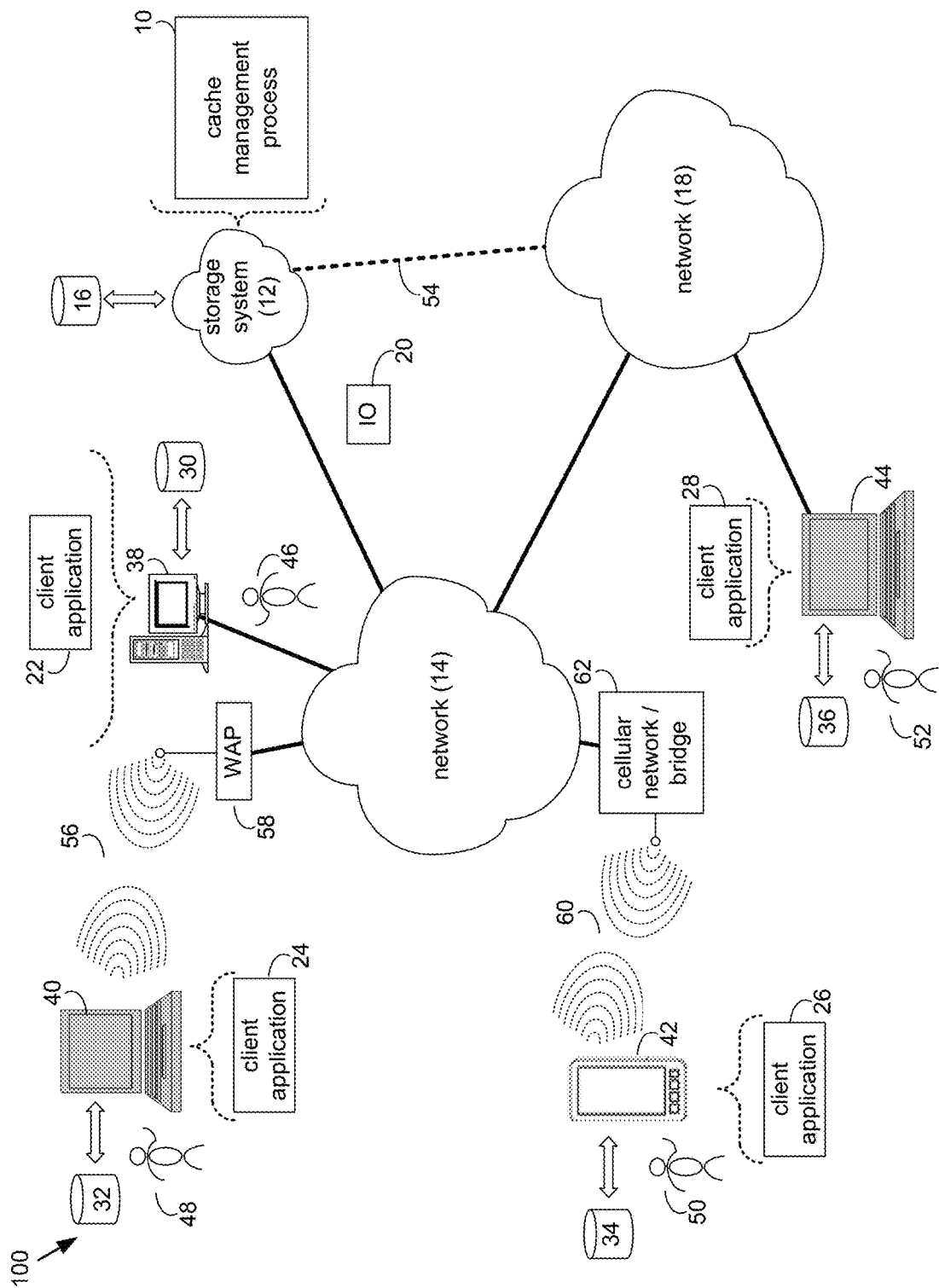
FIG. 1 is an example diagrammatic view of a storage system and a cache management process coupled to a distributed computing network according to one or more example implementations of the disclosure.

System Overview:

Referring to the example implementation of FIG. 1, there is shown cache management process 10 that may reside on and may be executed by storage system 12, which may be connected to network 14 (e.g., the Internet, a local area network, or a storage area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of cache management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a tablet computer (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a cache management process, such as cache management process 10 of FIG. 1, may include but is not limited to, receiving one or more IO requests at a cache system for storing content in a storage array. A maximum number of concurrent backend IO requests may be associated with the storage array based upon, at least in part, a change in size of the storage array. The one or more IO requests may be flushed via one or more backend IO requests from the cache system to the storage array based upon, at least in part, the maximum number of concurrent backend IO requests associated with the storage array.

Figure 2:
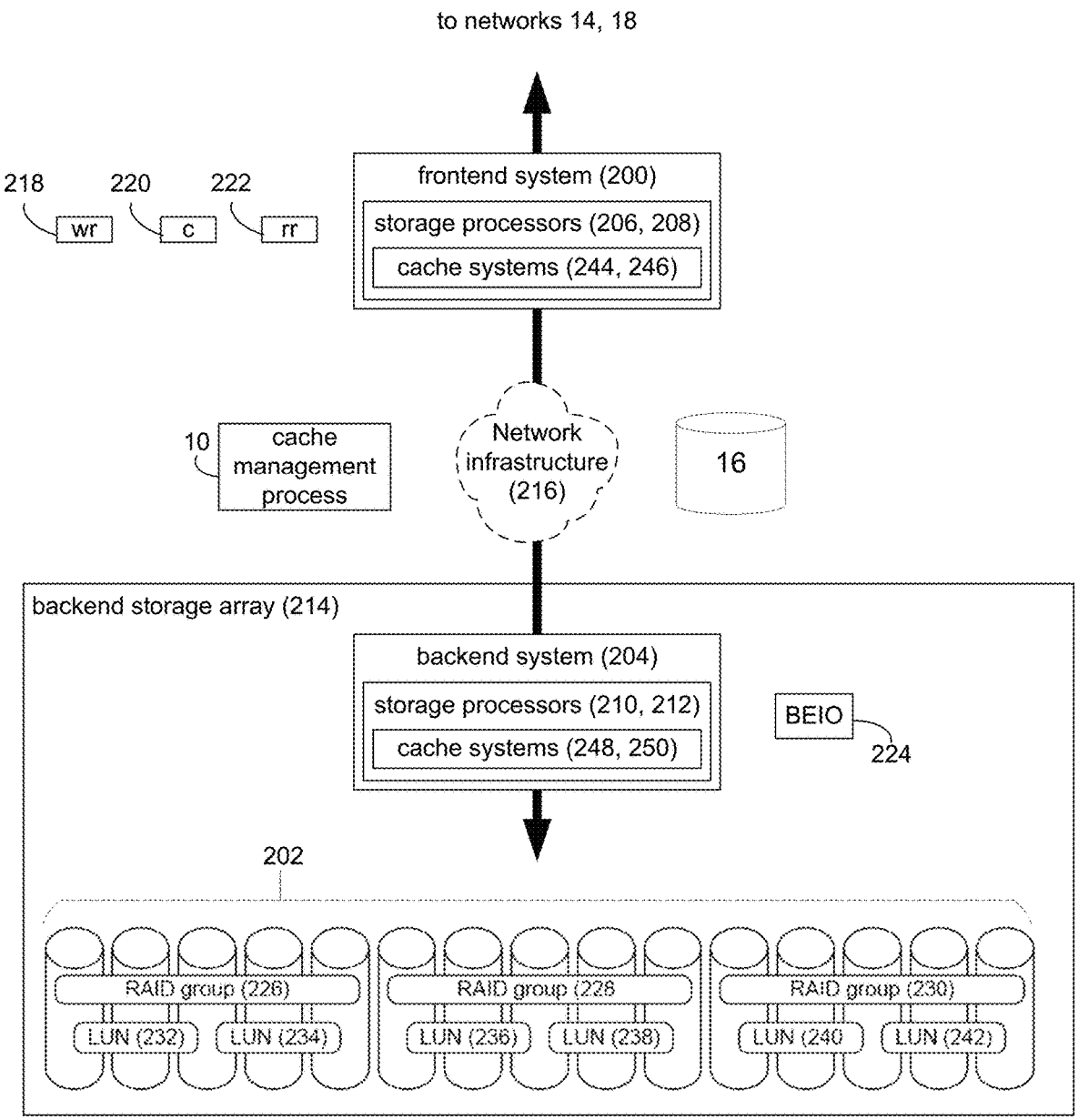
FIG. 2 is an example diagrammatic view of the storage system according to one or more example implementations of the disclosure.
Figure 3:
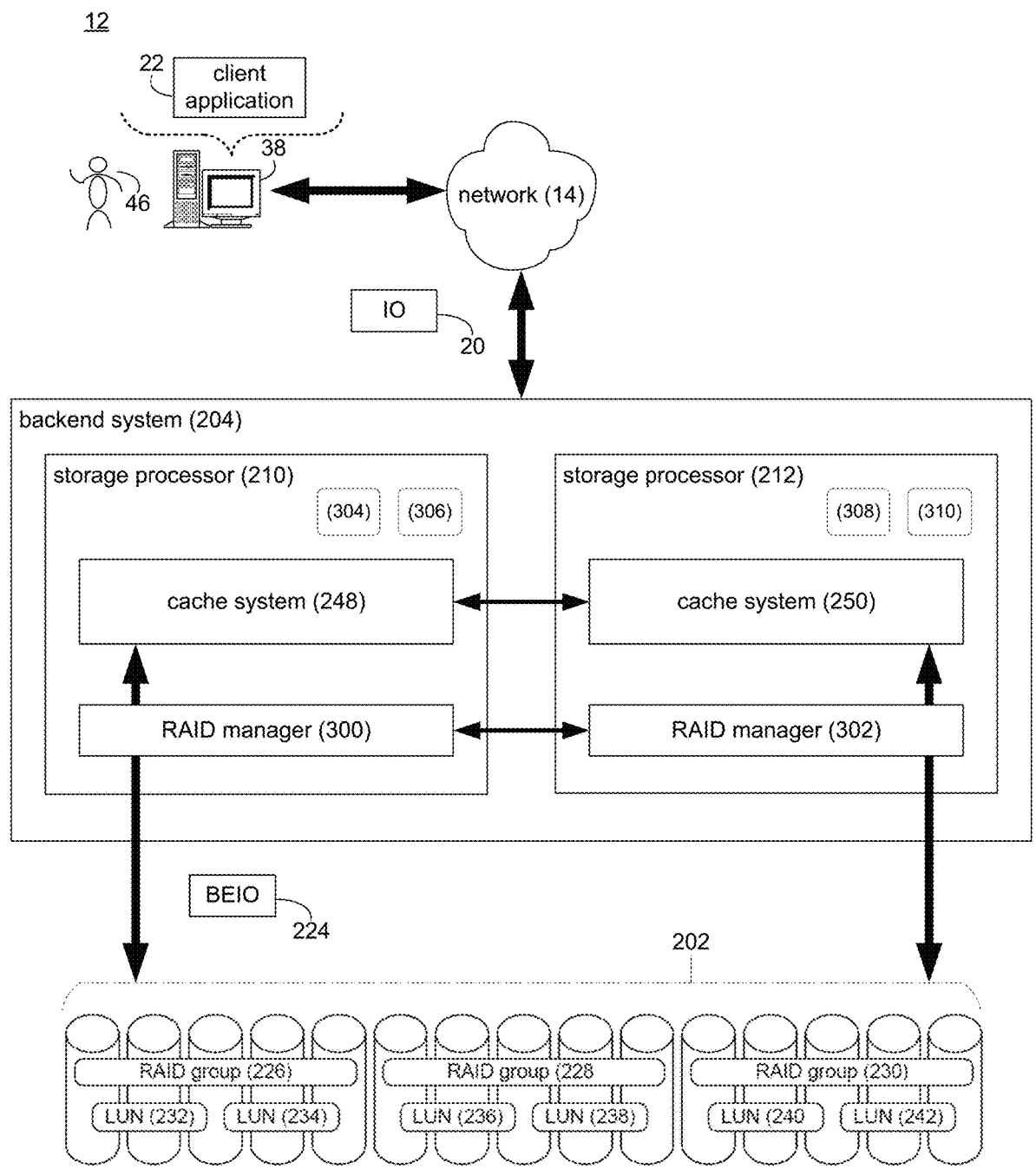
FIG. 3 is another example diagrammatic view of the storage system according to one or more example implementations of the disclosure.
Figure 4:
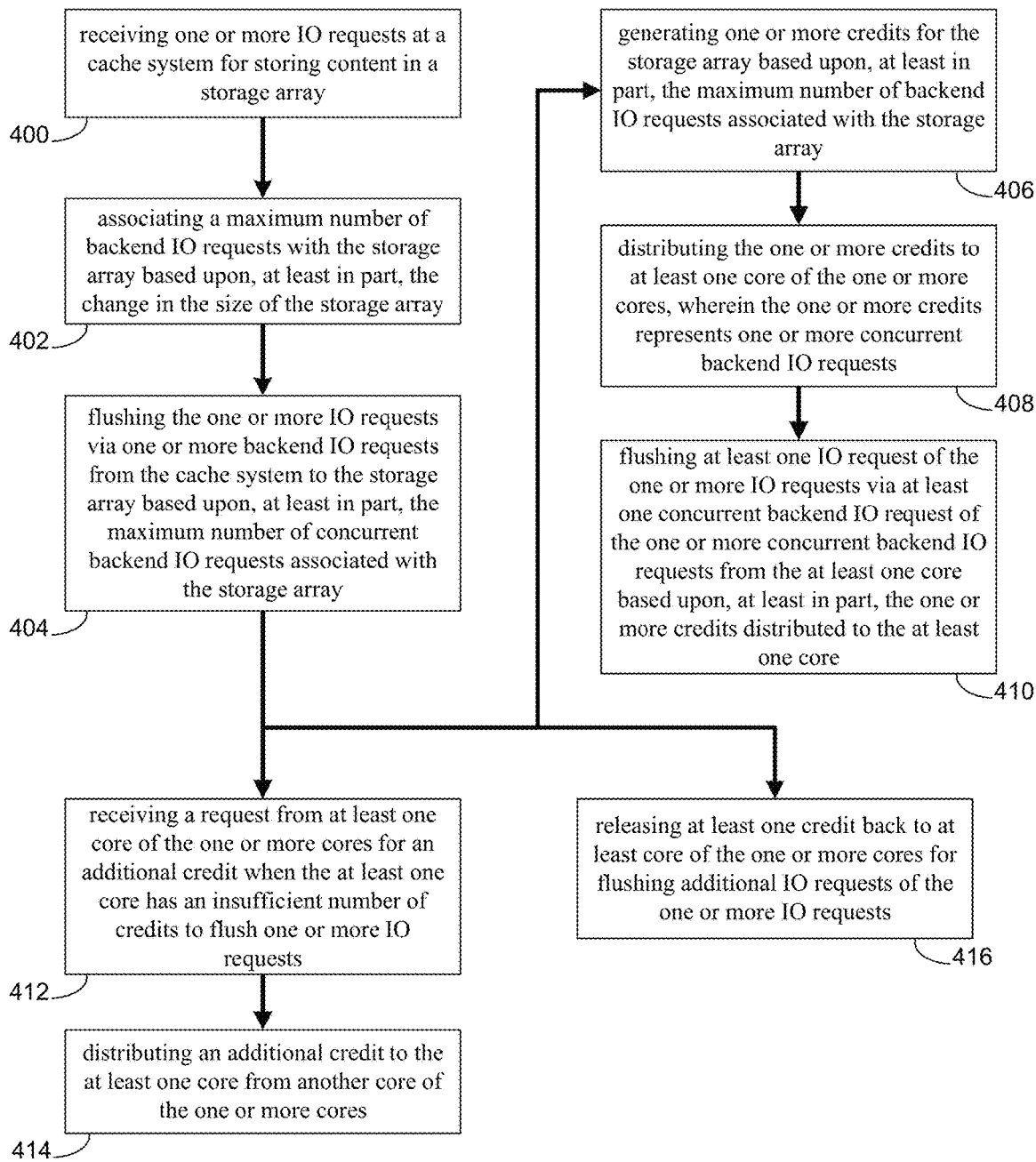
FIG. 4 is an example flowchart of a cache management process according to one or more example implementations of the disclosure.

The Storage System:

Referring also to the example implementations of FIGS. 2 and 3, storage system 12 may include one or more frontend systems (e.g., frontend system 200), a plurality of storage targets 202, and one or more backend systems (e.g., backend system 204). Examples of front end system 200 and backend system 204 may include but are not limited to one or more server computers or one or more storage processors 206, 208, 210, 212 available from Dell EMC™ of Hopkinton, Mass. The quantity of storage targets 202 included within plurality of storage targets 202 may be increased or decreased depending upon e.g., the level of redundancy/performance/capacity required.

Plurality of storage targets 202 may be configured to provide various levels of performance and/or high availability. For example, a portion of plurality of storage targets 202 may be configured as a RAID 0 array, in which data is striped across storage targets. By striping data across a plurality of storage targets, improved performance may be realized. However, RAID 0 arrays do not provide a level of high availability. Accordingly, a portion of plurality of storage targets 202 may be configured as a RAID 1 array, in which data is mirrored between storage targets. By mirroring data between storage targets, a level of high availability is achieved as multiple copies of the data are stored within storage system 12.

While plurality of storage targets 202 is discussed above as being configured in a RAID 0 or RAID 1 array, this is for illustrative purposes only and is not intended to be a limitation of this disclosure, as other configurations are possible. For example, plurality of storage targets 202 may be configured as a RAID 3, RAID 4, RAID 5 or RAID 6 array.

Plurality of storage targets 202 may include one or more coded targets. As is known in the art, a coded target may be used to store coded data that may allow for the regeneration of data lost/corrupted on one or more of plurality of storage targets 202. An example of such a coded target may include but is not limited to a hard disk drive that is used to store parity data within a RAID array. The quantity of coded targets included within plurality of storage targets 202 may be increased or decreased depending upon e.g., the level of redundancy/performance/capacity required.

Examples of plurality of storage targets 202 may include one or more electro-mechanical hard disk drives and/or solid-state/flash devices, wherein the combination of plurality of storage targets 202 and processing/control systems (e.g., backend system 204) may form backend storage array 214.

The manner in which storage system 12 is implemented may vary depending upon e.g., the level of redundancy/performance/capacity required. For example, storage system 12 may be a RAID device in which frontend system 200 is a RAID controller card and plurality of storage targets 202 are individual "hot-swappable" hard disk drives. An example of such a RAID device may include but is not limited to an NAS device. Alternatively, storage system 12 may be configured as a SAN, in which frontend system 200 may be e.g., a server computer or a storage processor and each of plurality of storage targets 202 may be a RAID device and/or computer-based hard disk drive. Further still, one or more of plurality of storage targets 202 may be a SAN.

In the event that storage system 12 is configured as a SAN, the various components of storage system 12 (e.g., frontend system 200, plurality of storage targets 202, and backend system 204) may be coupled using network infrastructure 216, examples of which may include but are not limited to an Ethernet (e.g., Layer 2 or Layer 3) network, a fiber channel network, an InfiniBand network, or any other circuit switched/packet switched network.

Storage system 12 may execute all or a portion of cache management process 10. The instruction sets and subroutines of cache management process 10, which may be stored on a storage device (e.g., storage device 16) coupled to frontend system 200 and/or backend system 204, may be executed by one or more processors (not shown) and one or more memory architectures (not shown) included within frontend system 200 and/or backend system 204. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g., IO request 20) may be generated. For example, these IO requests may be sent from client applications 22, 24, 26, 28 to storage system 12. Additionally/alternatively and when frontend system 200 is configured as (or coupled to) an application server, these IO requests may be internally generated within frontend system 200. Examples of IO request 20 may include but are not limited to data write request 218 (e.g., a request that content 220 be written to storage system 12) and data read request 222 (e.g., a request that content 220 be read from storage system 12). In some implementations and as will be discussed in greater detail below, various IO requests (e.g., IO request 20) may be received from client applications 22, 24, 26, 28 for reading and/or writing content to storage system 12. As will be discussed in greater detail below, various backend IO (BEIO) requests (e.g., BEIO request 224) may be generated. Examples of BEIO request 224 may include but are not limited to data write request 218 (e.g., a request that content 220 be written to storage system 12) and data read request 222 (e.g., a request that content 220 be read from storage system 12).

During operation of storage system 12, content 220 to be written to storage system 12 may be processed by frontend system 200 and/or backend system 204. Additionally/alternatively and when frontend system 200 is configured as (or coupled to) an application server, content 220 to be written to storage system 12 may be internally generated by frontend system 200.

The Cache Systems:

As discussed above, storage system 12 may include frontend system 200 and plurality of storage targets 202, wherein plurality of storage targets 202 may be configured to store data (e.g., content 220). In order to enable the storage of such data, backend storage array 214 may be configured to include a plurality of volume groups. Examples of such volume groups may include the above-described RAID groups (e.g., RAID groups 226, 228, 230), wherein each of these RAID groups (e.g., RAID groups 226, 228, 230) may include one or more Logical Unit Numbers (LUNs) (e.g., LUNs 232, 234 for RAID group 226, LUNs 236, 238 for RAID group 228, and LUNs 240, 242 for RAID group 230). As is known in the art, a LUN is a unit of logical storage that is defined within a storage system (e.g., storage system 12), wherein a LUN may span multiple physical storage devices (e.g., plurality of storage targets 202) while appearing to be a single storage device to a user.

Storage system 12 may include one or more cache systems (e.g., cache systems 244, 246 and/or cache systems 248, 250) that may be configured to enhance the performance of storage system 12. In this particular example, front end system 200 is shown to include cache systems 244, 246 and backend system 204 is shown to include cache systems 248, 250. During operation of storage system 12, data to be written to storage system 12 (e.g., content 220) may be temporarily stored on one or more of cache systems 244, 246 upon receipt of content 220 by frontend system 200, thus avoiding any delays associated with waiting for content 220 to be stored in storage array 214. Further, content 220 may be temporarily stored on one or more of cache systems 246, 248 upon receipt of content 220 by backend system 204, thus avoiding any delays associated with waiting for content 220 to be stored on plurality of storage targets 202. Further performance enhancements may be achieved when content to be read from storage system 12 is available in cache systems 244, 246 and/or cache systems 248, 250 (thus avoid the delays associated with retrieving the content to be read from backend system 204 and/or plurality of storage targets 202 (respectively).

Referring again to the example implementation of FIG. 3 and as discussed above, storage system 12 may include a frontend system 200 and/or a backend system 204. In some implementations, frontend system 200 and/or backend system 204 may include one or more storage processors (e.g., storage processors 206, 208 (e.g., the front end storage processors) and storage processors 210, 212 (e.g., the backend storage processors)), one or more cache systems (e.g., cache systems 244, 246 (e.g., the front end cache systems) and cache systems 248, 250 (e.g., the backend cache systems)), and one or more RAID managers (e.g., RAID managers 300, 302) to enhance the performance of storage system 12, wherein the storage processors 206, 208, 210, 212 and/or cache systems 244, 246, 248, 250 may be managed by cache management process 10. For the following discussion, cache systems 244, 246 and cache systems 248, 250 will be discussed simultaneously and interchangeably.

In some implementations, the one or more cache systems (e.g., cache systems 244, 246, 248, 250) may include one or more dynamic random access memory (DRAM) caches and/or one or more multi-core caches (MCC) as offered by Dell EMC™ of Hopkinton, Mass. However, other cache configurations are possible and within the scope of the present disclosure.

In some implementations, the one or more RAID managers (e.g., RAID managers 300, 302) may include, but are not limited to, one or more multi-core RAIDs (MCR) as offered by Dell EMC™ of Hopkinton, Mass.

In some implementations, the one or more storage processors (e.g., storage processors 206, 208, 210, 212) may be multi-core processors with one or more cores (e.g., cores 304, 306, 308, 310) that may be configured to simultaneously and/or concurrently process IO requests (e.g., IO request 20 and/or backend 10 (BEIO) request 224). Cores of a multi-core processor may include, but are not limited to, central processing unit (CPU) cores. However, other configurations of and/or types of cores of a multi-core processor are within the scope of the present disclosure. Additionally, while one or more cores (e.g., cores 304, 306) are shown within storage processor 210, the one or more cores may be considered part of and/or included within one or more cache systems (e.g., cache system 248). As will be discussed in greater detail below, one or more cores of the multi-core processor may process and/or flush one or more IO requests (e.g., IO request 20) via one or more BEIO requests (e.g., BEIO request 224) from the one or more cache systems to the plurality of storage targets 202 within backend storage array 214. While storage processors 210, 212 have been shown to each include two cores, this is for example purposes only as any number of cores (e.g., one or more) may be used within the scope of the present disclosure.

As discussed above, various IO requests (e.g., IO request 20) may be received at storage system 12. In some implementations, a plurality of IO requests may be received by a storage processor (e.g., storage processor 206, 208, 210, 212) of frontend system 200 and/or of backend system 204. In some implementations, a plurality of IO requests may be sent to the one or more storage processors (e.g., storage processors 210, 212) of backend system 204 for parallel or concurrent processing. For example, 10 request 20 may be received at backend system 204 by storage processor 210 and temporarily stored in cache system 248. Core 304 may process IO request 20 by flushing IO request 20 via BEIO request 224 to the plurality of storage targets 202. Additionally/alternatively, another IO request may be received at backend system 204 by storage processor 210 and temporarily stored in cache system 248. Core 306 may process the additional IO request in parallel with core 304 by flushing the additional IO request via another BEIO request to the plurality of storage targets 202. Continuing with the above example, another IO request may be received at backend system 204 by storage processor 212 and temporarily stored in cache system 250. Core 308 may process the additional IO request in parallel with cores 304, 306 by flushing the additional IO request via another BEIO request to the plurality of storage targets 202. While this example refers to backend system 204, it is within the scope of the present disclosure for a plurality of IO requests to be sent to the storage processors (e.g., storage processors 206, 208) of frontend system 200.

In some implementations, cache system 248 and cache system 250 and/or RAID manager 300 and RAID manager 302 may be communicatively coupled to allow for high availability. In some implementations, cache system 248 and cache system 250 may replicate the contents of each cache system in every other cache system for high availability. For example, if cache system 248 were to go offline, cache system 250 would have a copy of the one or more IO requests received by cache system 248 and vice versa. Additionally, RAID manager 300 and RAID manager 302 may replicate the contents of each RAID manager in every other RAID manager for high availability. For example, if RAID manager 300 were to go offline, RAID manager 302 would be able to function in place of RAID manager 300 and vice versa.

As discussed above, in order to enable the storage of data within storage system 12, backend storage array 214 may be configured to include a plurality of volume groups (e.g., RAID groups 226, 228, 230). Accordingly, a pending queue (not shown) may be associated with each RAID group. As will be discussed in greater detail below, the queue depth limit of the pending queue may define the maximum number of concurrent IO requests that may be processed by a storage array concurrently. In some implementations, the queue depth limit may be based upon, at least in part, the one or more storage targets (e.g., backend disks) within a storage array (e.g., a RAID group). While disks of a RAID group are discussed in this example, any storage object of a storage array is within the scope of the present disclosure.

The Cache Management Process:

As discussed above and referring also to the example implementations of FIGS. 4-13, cache management process 10 may receive 400, at the computing device, one or more IO requests at a cache system for storing content in a storage array and may associate 402 a maximum number of concurrent backend IO requests with the storage array based upon, at least in part, a change in size of the storage array. Cache management process 10 may flush 404 the one or more IO requests via one or more backend IO requests from the cache system to the storage array based upon, at least in part, the maximum number of concurrent backend IO requests associated with the storage array.

In some implementations where, for example purposes only, an IO request (e.g., IO request 20) is a write request, cache management process 10 may store the data (e.g., content 220) in a cache system (e.g., cache system 248) and acknowledges the request. As will be discussed in greater detail below, cache management process 10 may flush 404 the data (e.g., content 220) to the plurality of storage targets 202. In some implementations where an IO request is a read request, cache management process 10 may first search the data in cache, if the data is already in cache, cache management process 10 may complete the request with the cached data, otherwise, cache management process 10 may initiate a backend 10 (BEIO) request (e.g., BEIO request 224) to read data from the plurality of storage target 202.

As discussed above, storage targets (e.g., backend disks) which may make up a storage array (e.g., RAID group 226, 228, 230) may have a queue depth limit, so the number of IOs which cache management process 10 (via cache system 248) may send down to the storage array (e.g., RAID group 226, 228, 230 and/or backend storage array 214) concurrently may be limited. As will be discussed in greater detail below, to protect the storage array (e.g., backend RAID group 226, 228, 230 and/or backend storage array 214) from overload, cache management process 10 may limit the number of outstanding BEIOs to each RAID group.

In some implementations, cache management process 10 may associate 402 a maximum number of concurrent backend IO requests with the storage array based upon, at least in part, a change in size of the storage array. In some implementations, a storage array (e.g., RAID group 226, 228, 230 and/or backend storage array 214) may be shrunk or expanded by removing or adding disks. In one embodiment, cache management process 10 may determine that the size of the storage array has increased. In some implementations, cache management process 10 may determine that the size of the storage array has decreased. In some implementations, e.g., where the cache system has no awareness of the changing of the size of the storage array, cache management process 10 may send the same number of BEIOs down to the storage array (e.g., RAID group 226, 228, 230 and/or backend storage array 214). In the example where the size of the storage array is increased (e.g., by expanding RAID group 226, 228, 230 and/or backend storage array 214), the newly added disks may not be fully leveraged. In the example where the size of the storage array is decreased, (e.g., by shrinking RAID group 226, 228, 230 and/or backend storage array 214), the backend RAID group may be overloaded.

In some implementations, the maximum number of concurrent backend 10 requests associated with the storage array may be determined based upon, at least in part, how many storage targets and/or how many disks make up the storage array (e.g., RAID group 226, 228, 230 and/or backend storage array 214) and the type of these storage targets and/or disks. In some implementations, the maximum number of concurrent backend IO requests may be determined by multiplying the total number of storage targets (e.g., disks or drives) in the storage array by the queue depth for the type of storage targets (e.g., type of disks or drives) in the storage array.

In some implementations, cache management process 10 may flush 404 one or more IO requests via one or more backend IO requests from the cache system to the storage array based upon, at least in part, the maximum number of concurrent backend IO requests associated with the storage array. In some implementations, cache management process 10 may limit the number of concurrent IO to the storage target based upon, at least in part, the maximum number of concurrent backend IO requests associated with the storage array and may protect the storage array from overload.

In some implementations, the one or more backend IO requests may be flushed from the cache system via one or more cores of one or more multi-core processors. In some implementations, flushing 404 the one or more BEIO requests to a storage array may be performed on at least one core independent of the other cores. In some implementations, cache management process 10 may use a resource called "credits" to control the processing and/or flushing of concurrent BEIO requests (e.g., BEIO request 224) by the one or more cores of the one or more multi-core processors.

In some implementations, cache management process 10 may generate 406 one or more credits for the storage array based upon, at least in part, the maximum number of concurrent backend IO requests associated with the storage array. The number of credits for a storage array (e.g., RAID group 226, 228, 230) may be proportional or equal to the maximum number of concurrent BEIOs that may be flushed to the storage array (e.g., RAID group 226, 228, 230). In one example, the number of one or more credits for the storage array may be calculated by the example Equation 1:

$$C_t = N_d * Q_t \quad (1)$$

$C_t$: Total credits for the RAID Group
$N_d$: Total drive number in this RAID Group
$Q_t$: queue depth of this storage target/disk type In some implementations, the queue depth for a hard disk drive (HDD) may be "30" and the queue depth for a solid state drive (SSD) may be "60". While HDDs and SSDs have been described, it will be appreciated that other types of storage devices may be used without departing from the scope of the disclosure.

Referring again to the example implementation of FIG. 3, a RAID manager (e.g., RAID manager 300) may manage a storage array (e.g., RAID group 226, 228, 230 and/or backend storage array 214) and may be responsible for handling changes in size of the storage array (e.g., increases and/or decreases in size). In some implementations, the RAID manager (e.g., RAID manager 300) may store the details of the storage array (e.g., each RAID group in storage array). In some implementations, cache management process 10 may obtain a storage array's (e.g., RAID group 226, 228, 230 and/or backend storage array 214) information from RAID manager to know its credits, and may inform the one or more cache systems of the changes in size to the storage array. In some implementations, and as will be discussed in greater detail below, cache management process 10 may include one or more interfaces between one or more cache systems and one or more RAID managers to generate the one or more credits for the storage array and to determine a change in size of the storage array.

Figure 7:
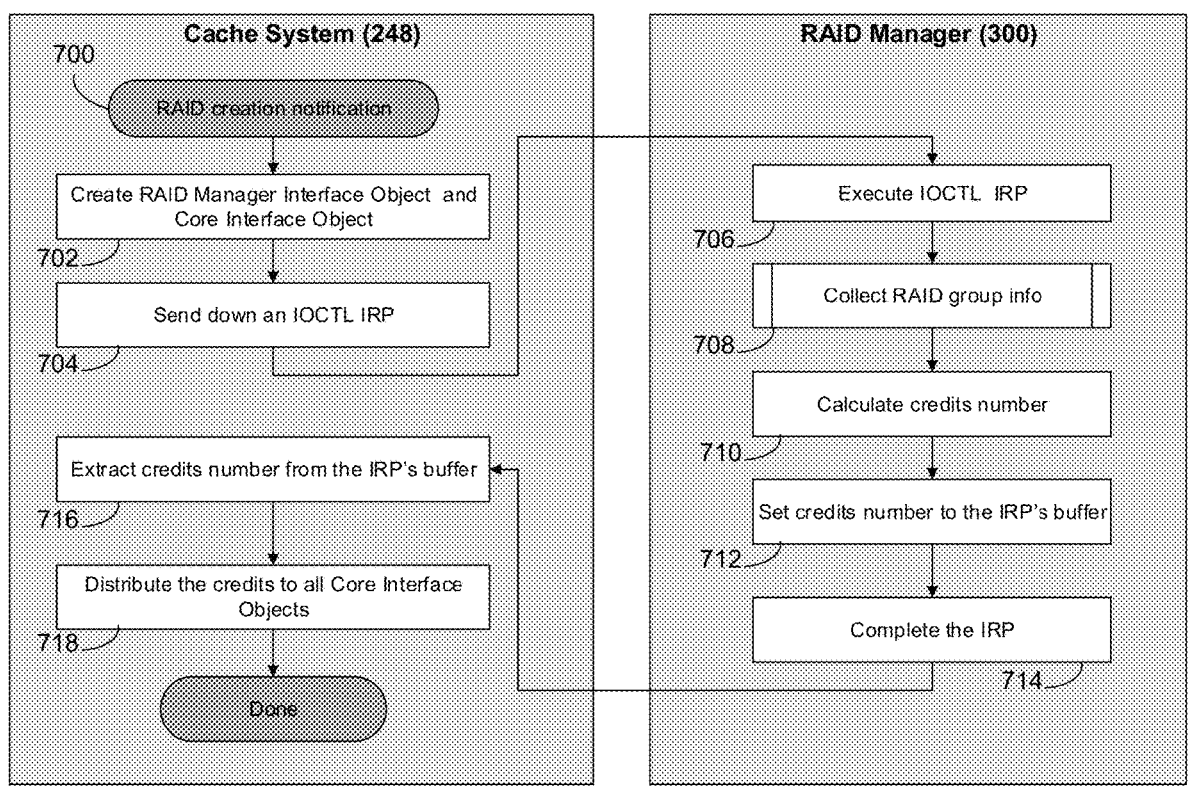
FIG. 7 is another example flowchart of a cache management process according to one or more example implementations of the disclosure.
Figure 8:
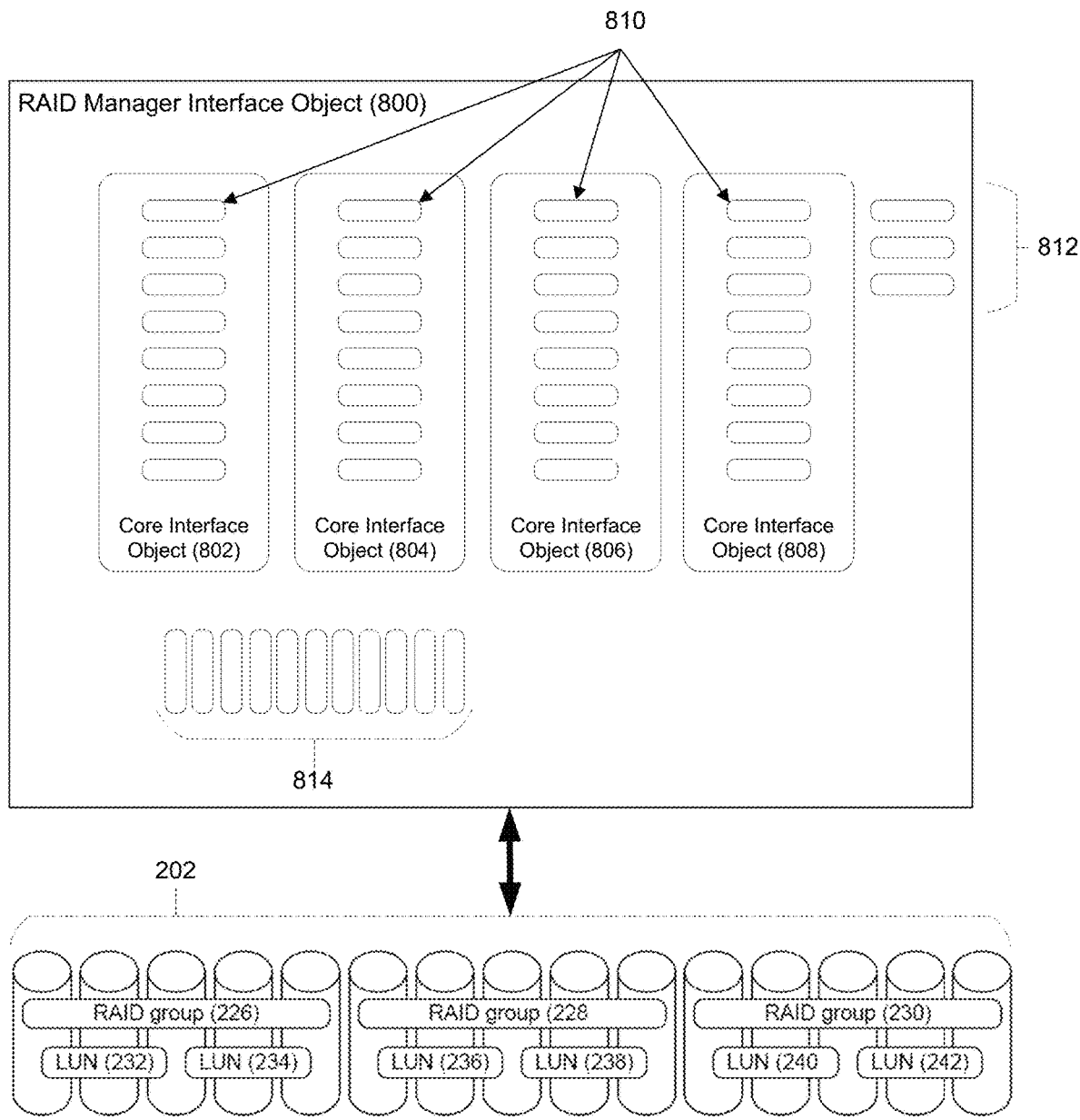
FIG. 8 is another diagrammatic view of the storage system according to one or more example implementations of the disclosure.
Figure 9:
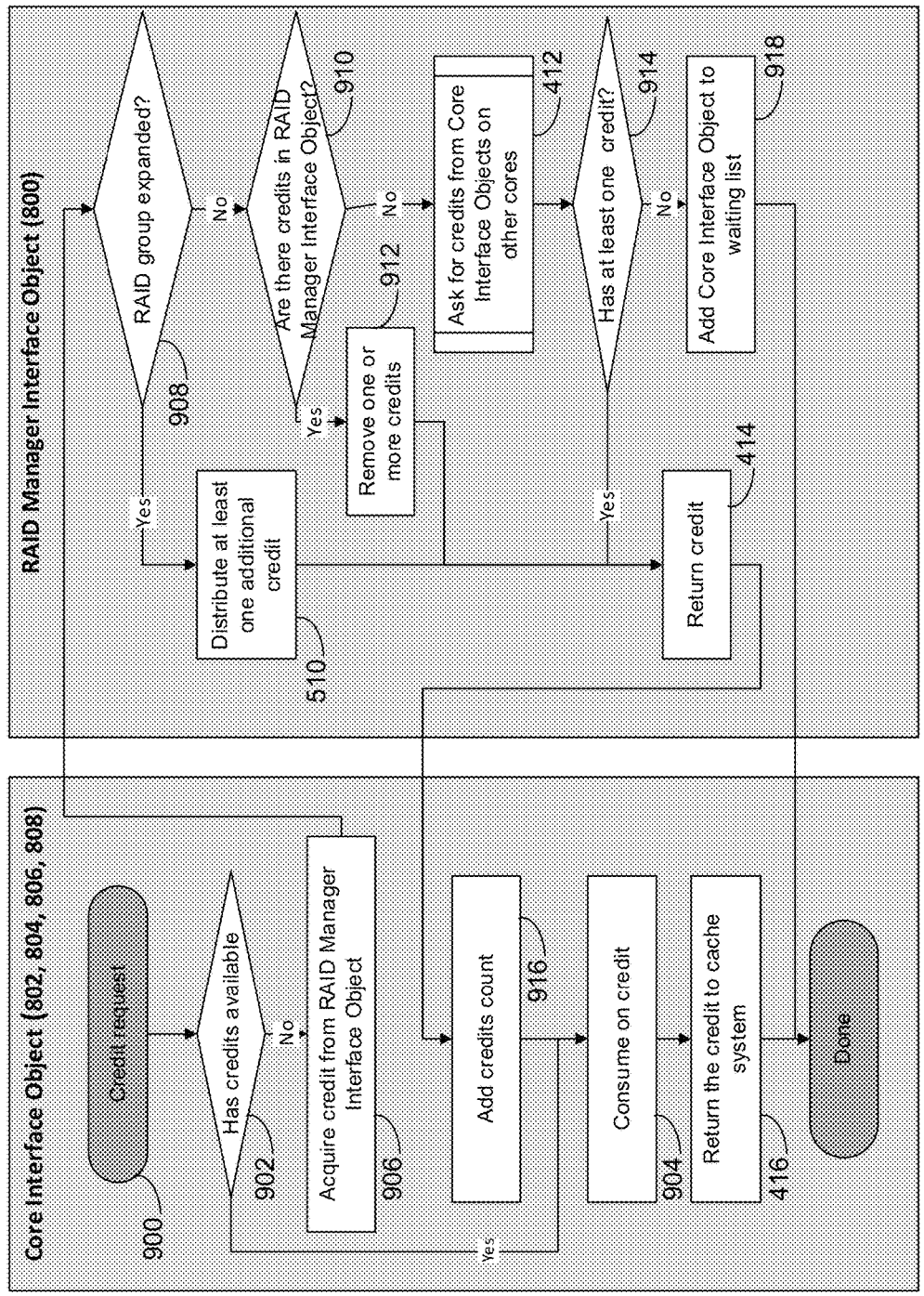
FIG. 9 is another example flowchart of a cache management process according to one or more example implementations of the disclosure.

Referring also to the example implementations of FIGS. 7 and 8, a cache system may be informed when a storage array is created. In some implementations, a cache system (e.g., cache system 248) may receive 700 a notification from RAID manager indicating that a storage array has been created. After receiving the storage array creation notification, cache management process 10 may create 702 at least one RAID Manager Interface Object (e.g., RAID Manager Interface Object 800) and one or more Core Interface Objects (e.g., Core Interface Objects 802, 804, 806, 808). As will be described in greater detail below, a "RAID Manager Interface Object" may generally include, but is not limited to, a component within the cache system (e.g., cache system 248) configured to manage one or more credits per storage array (e.g., RAID group 226, 228, 230 and/or backend storage array 214). A "Core Interface Object" may generally include, but is not limited to, a component within the cache system configured to manage one or more credits per core (e.g., cores 304, 306, 308, 310) per storage array. In some implementations, the one or more Core Interface Objects (e.g., Core Interface Objects 802, 804, 806, 808) may be created on the one or more cores. In some implementations, a Core Interface Object may be created on each core of the one or more cores (e.g., cores 304, 306, 308, 310). In some implementations, the total number of Core Interface Objects (e.g., Core Interface Objects 802, 804, 806, 808) may be, for example purposes only, equal to the number of the cores (e.g., cores 304, 306, 308, 310) on the system (e.g., frontend system 200 and/or backend system 204).

In some implementations, a first interface of the one or more interfaces between the one or more cache systems and the one or more RAID managers may include an input/output control (IOCTL) IO request packet (IRP) sent 704 by cache management process 10 to RAID manager 300 to fetch a number of credits (e.g., credits 810) or a credits count of the new storage array (e.g., RAID group 226, 228, 230). In some implementations, the IOCTL IRP may include an IOCTL code to direct RAID manager 300 to obtain (e.g., via cache management process 10) the information associated with the storage array.

In some implementations, a second interface of the one or more interfaces between the one or more cache systems and the one or more RAID managers may be sent to RAID manager 146 and may include an input/output control (IOCTL) IO request packet (IRP) sent 282 by cache management process 10 to RAID manager 146 to cause RAID manager 146 to determine when there is a change in the size of the storage array. In some implementations, the IOCTL IRP may include an IOCTL code to direct RAID manager 300 to return (e.g., via cache management process 10) the IRP when there is a change in the size of the storage array. In some implementations, RAID Manager may not complete this IRP immediately. After a RAID group has been shrunk or has been expanded, RAID Manager (e.g., via core management process 10) may complete this IRP. As will be discussed in greater detail below, after receiving the completion of the IRP, cache management process 10 may determine that a RAID group has been shrunk or expanded and may revise the number of credits.

Returning to the example implementation of FIG. 7, RAID manager 300 may execute 706 (e.g., via cache management process 10) the IOCTL IRP of the first interface and collect 708 information associated with the storage array (e.g., RAID group) and calculate 710 a total number of credits. RAID manager 300 may set 712 the number of credits in the IRP's buffer and complete 714 the IRP with number of credits and/or credits count to cache system (e.g., cache system 248).

Cache management process 10 (via cache system 248) may extract 716 the number of credits and generate and/or distribute 718 the one or more credits 810 to the RAID Manager Interface Object 800 based upon, at least in part, the number of credits calculated by the RAID manager. In some implementations, the RAID Manager Interface Object 800 may be configured to distribute (e.g., via core management process 10) the one or more credits to one or more Core Interface Objects 802, 804, 806, 808.

Referring also to the example implementation of FIG. 8, in some implementations, cache management process 10 may distribute 408 the one or more credits (e.g., credits 810) to at least one core of the one or more cores. In some implementations, the backend system 204 may include one or more cores (e.g., cores 304, 306, 308, 310) for processing and/or flushing 404 the one or more IO requests to the storage array. As discussed above, the one or more credits (e.g., credits 810) may represent one or more concurrent backend IO requests. In some implementations, cache management process 10 may distribute the one or more credits (e.g., credits 810) from the RAID Manager Interface Object (e.g., RAID Manager Interface Object 800) to the one or more Core Interface Objects (e.g., Core Interface Objects 802, 804, 806, 808) for the one or more cores. In one example, cache management process 10 may distribute the one or more credits 810 to the one or more Core Interface Objects (e.g., Core Interface Objects 802, 804, 806, 808) evenly. In some implementations, if the number of credits isn't evenly divisible by the number of one or more Core Interface Objects, the remaining credits (e.g., additional credits 812) may be kept in the at least one RAID Manager Interface Object (e.g., RAID Manager Interface Object 800). In some implementations, RAID Manager Interface Object 800 may maintain (e.g., via core management process 10) a maximum credits number and a current credits number. The maximum credits number may be equal to the credits count for the storage array. The current credits number may be the sum of the credits allocated or distributed to each Core Interface Object (e.g., Core Interface Objects 802, 804, 806, 808). In some implementations, the maximum credits number minus the current credits number may be, for example, the number of credits kept or stored (e.g., additional credits 812) in the RAID Manager Interface Object (e.g., RAID Manager Interface Object 800).

While the above example(s) describe generating 406 and distributing 408 the one or more credits in response to a storage array creation notification, this is for example purposes only and is not meant to be a limitation as the one or more credits that may be generated and distributed at any time, including after the creation of the storage array.

In some implementations, cache management process 10 may flush 410 at least one IO request of the one or more IO requests via at least one concurrent backend IO request of the one or more concurrent backend IO requests from the at least one core based upon, at least in part, the one or more credits distributed to the at least one core. Referring also to the example limitation of FIG. 9, cache management process 10 may receive 900 a request for a credit (e.g., in response to an IO request being received in the cache system and/or in at least one core of the one or more cores). As discussed above, one or more Core Interface Objects (e.g., Core Interface Objects 802, 804, 806, 808) may (e.g., via cache management process 10) manage the credits which RAID Manager Interface Object (e.g., RAID Manager Interface Object 800) allocate or distribute (e.g., via cache management process 10) to it. Before flushing a BEIO request, cache system 248 (e.g., via cache management process 10) may request one or more credits from the Core Interface Object (e.g., Core Interface Objects 802, 804, 806, 808) related to the core on which current thread running (e.g., BEIO request). If cache management process 10 determines 902 that there are credits available on the Core Interface Object, the one or more credits on the Core Interface Object may be consumed 904. In some implementations, the consumption of the credit from the Core Interface Object may not disturb Core Interface Objects on other cores. If the Core Interface Object has no credit available, cache system 248 may (e.g., via cache management process 10) request 906 one or more credits from RAID Manager Interface Object (e.g., RAID Manager Interface Object 800). The RAID Manager Interface Object may (e.g., via cache management process 10) determine whether the number of available credits is greater than the number of cores. If the number of current credits is greater than the number of cores, cache management process 10 may determine 908/500 that the storage array has expanded. This will be discussed in greater detail below. Otherwise, cache management process 10 may determine 910 if there are credits available in the RAID Manager Interface Object (e.g., RAID Manager Interface Object 800), cache management process 10 may remove 912 one or more credits to the requesting Core Interface Object. If there are no credits available at the RAID Manager Interface Object (e.g., RAID Manager Interface Object 800), cache management process 10 may request 412 the one or more credits from Core Interface Objects on other cores (e.g., Core Interface Objects 802, 804, 806, 808).

In some implementations, cache management process 10 may receive 412 a request and/or process the request from at least one core of the one or more cores for an additional credit when the at least one core has an insufficient number of credits to flush one or more IO requests and may determine 914 if the at least one core of the one or more cores (e.g., cores 304, 306, 308, 310) has one or more additional credits (e.g., additional credits 812).

In some implementations, cache management process 10 may distribute or return 414 an additional credit to the at least one core from another core (e.g., Core Interface Object associated with another core) of the one or more cores (e.g., Core Interface Objects associated with one or more cores) when cache management process 10 determines 916 that at least one core of the one or more cores has one or more additional credits (e.g., additional credits 812).

if cache management process 10 is able to return 414 one or more credits to a Core Interface Object (e.g., Core Interface Objects 802, 804, 806, 808), Core Interface Object may add 916 (e.g., via cache management process 10) the one or more credits returned to a count of credits distributed to the Core Interface Object and may consume 904 (e.g., via cache management process 10) the one or more credits.

In some implementations, cache management process 10 may release 416 at least one credit back to at least one core of the one or more cores for flushing additional IO requests of the one or more IO requests. Assume for example purposes only that core 304 consumes 904 at least one credit (e.g., credit 810) and flushes 404 a BEIO request from cache system 248 to storage array 214. Cache management process 10 may release 416 at least one credit back to RAID Manager Interface Object 800 for flushing additional IO requests. As discussed above, the at least one credit released back to RAID Manager Interface Object 800 may be requested by another core for flushing one or more IO requests.

If cache management process 10 is unable to obtain a credit for Core Interface Object (e.g., Core Interface Objects 802, 804, 806, 808) from RAID Manager Interface Object and/or at least one core of the one or more cores (e.g., cores 304, 306, 308, 310), cache management process 10 may determine 916 that RAID Manager Interface Object does not have any credit and the other Core Interface Objects do not have credit.

In some implementations, the requesting Core Interface Object may be inserted 918 into waiting list 814. In some implementations, the RAID Manager Interface Object may be configured to maintain the waiting list 814 which may store a reference to the Core Interface Objects (e.g., Core Interface Objects 802, 804, 806, 808) which are waiting for credits. In some implementations, the waiting list 814 may be in a sorted order such that one or more Core Interface Objects with high priority requests are towards the head of the list and one or more Core Interface Objects (e.g., Core Interface Objects 802, 804, 806, 808) with low priority requests are towards the tail of the list. When a credit becomes available, cache management process 10 may signal the head of the list.

As described above, cache system 248 may acquire (e.g., via core management process 10) a credit from the Core Interface Object associated with the core on which a current thread is running. If the Core Interface Object has no credit, it may request and/or acquire credits (e.g., via cache management process 10) from the RAID Manager Interface Object (e.g., RAID Manager Interface Object 800).

Figure 5:
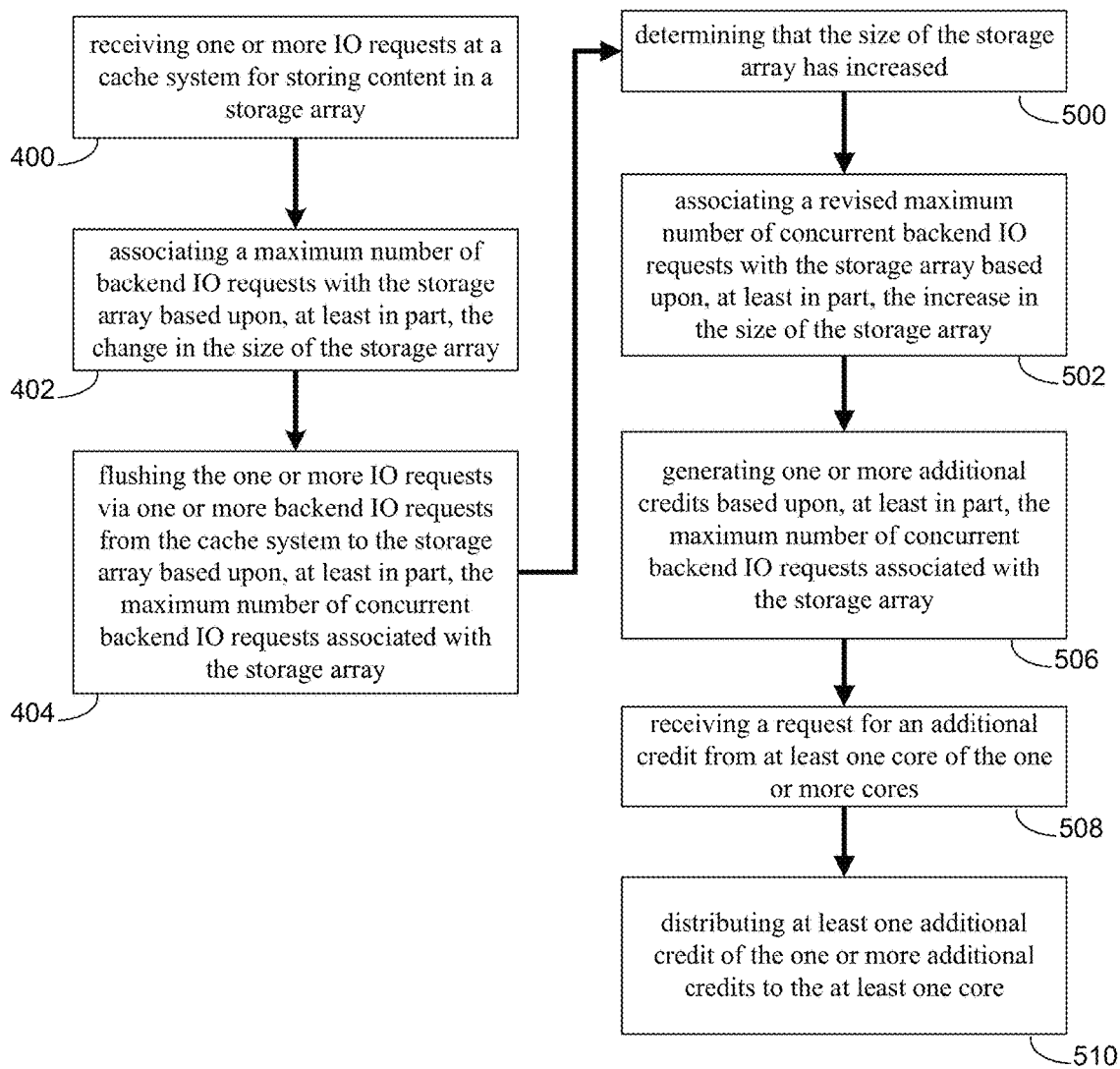
FIG. 5 is another example flowchart of a cache management process according to one or more example implementations of the disclosure.

Referring also to the example implementation of FIG. 5 in some implementations, cache management process 10 may determine 500 that the size of the storage array has increased. In some implementations where the size of the storage array is increased (e.g., by expanding RAID group 226, 228, 230), the newly added disks may be leveraged by cache management process 10 to increase the number of concurrent BEIO requests flushed to the storage array.

In some implementations, cache management process 10 may associate 502 a revised maximum number of concurrent backend IO requests with the storage array based upon, at least in part, the increase in the size of the storage array. In some implementations, cache system 248 may subscribe to a storage array expand notification. In one example, cache management process 10 may use the second interface of the one or more interfaces between the one or more cache systems and the one or more RAID managers described above to subscribe to the notification. In some implementations, cache management process 10 may send an IOCTL IRP down to RAID manager. As discussed above, RAID Manager may not complete this IRP immediately but may complete the IRP (e.g., via core management process 10) after RAID manager 300 determines (e.g., via core management process 10) that the size of storage array has changed.

Figure 10:
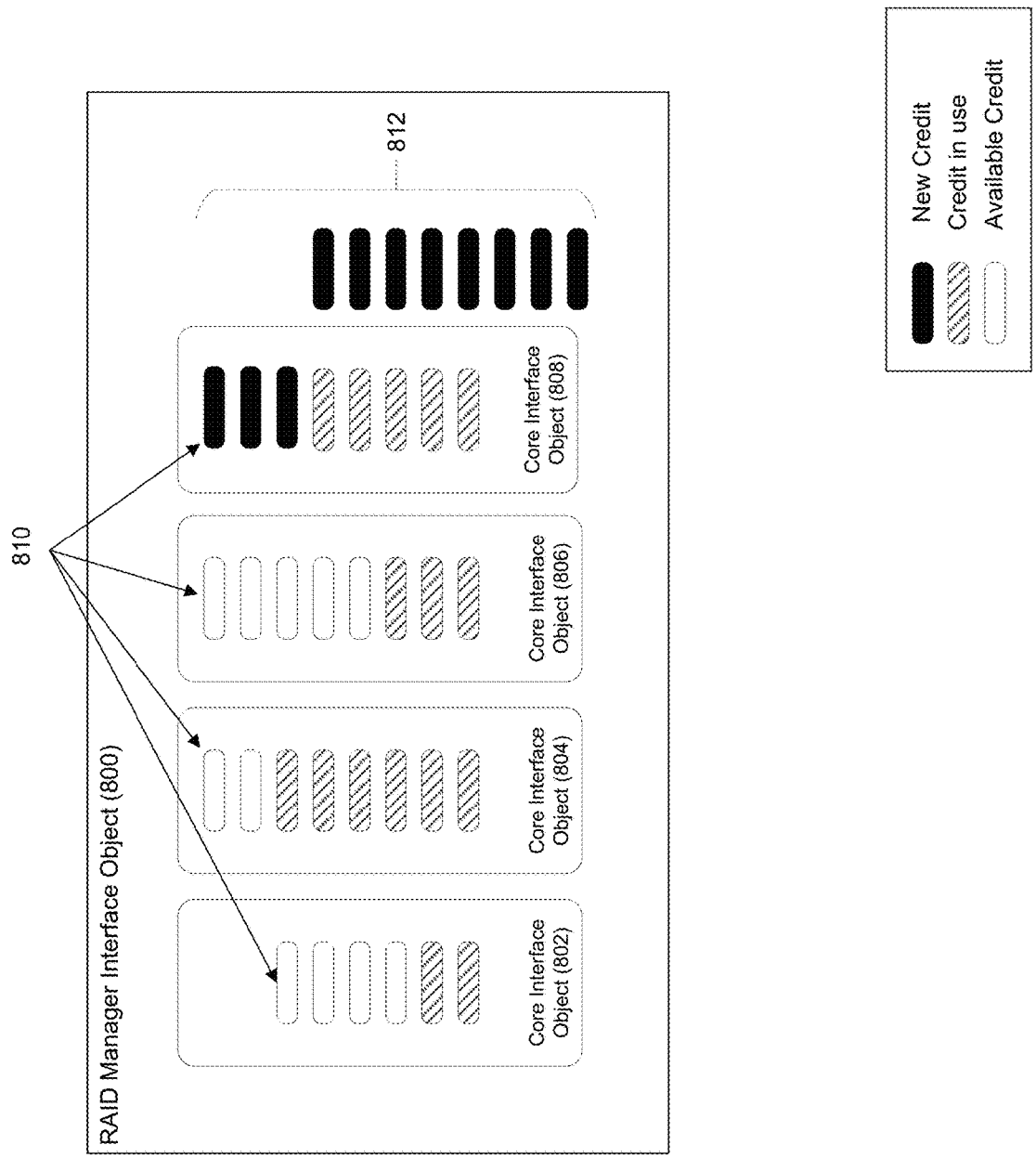
FIG. 10 is another example diagrammatic view of the storage system according to one or more example implementations of the disclosure.

Referring also to the example implementation of FIG. 10, in some implementations, cache management process 10 may generate 506 one or more additional credits based upon, at least in part, the maximum number of concurrent backend IO requests associated with the storage array. After receiving the completion of the IRP, cache management process 10 may retrieve the new credits count (e.g., revised maximum number of backend IO requests associated with the storage array based upon the change in size of the storage array) from RAID Manager and may generate 506 the one or more additional credits (e.g., additional credits 812) in the RAID Manager Interface Object (e.g., RAID Manager Interface Object 800).

In some implementations, cache management process 10 may receive a request 508 for an additional credit from at least one core of the one or more cores. As discussed above, the RAID Manager Interface Object (e.g., RAID Manager Interface Object 800) may determine (e.g., via cache management process 10) whether the number of available credits is greater than the number of cores. If the number of current credits is greater than the number of cores, cache management process 10 may determine 500 that the storage array has expanded.

In some implementations, cache management process 10 may distribute 510 at least one additional credit of the one or more additional credits (e.g., additional credits 812) to the at least one core. Additionally and/or alternatively, the one or more additional credits (e.g., additional credits 812) may be allocated or distributed 510 to one or more Core Interface Objects (e.g., Core Interface Objects 802, 804, 806, 808) which may not have enough credits to initiate one or more BEIO requests (e.g., BEIO request 224). In some implementations, to reduce the number of times a credit is requested, the RAID Manager Interface Object (e.g., RAID Manager Interface Object 800) may allocate and/or distribute (e.g., via core management process 10) a pre-defined number of credits for one or more requests. In one example, the pre-defined number of credits may be the number of additional credits (e.g., additional credits 812) divided by the number of cores. Additionally and/or alternatively, the credits may be distributed based upon, at least in part, the relative priority of at least one core of the one or more cores.

Referring again to the example implementation of FIG. 10, after expanding, the newly generated one or more additional credits (e.g., additional credits 812) may be held by the RAID Manager Interface Object (e.g., RAID Manager Interface Object 800). A credit request may be received from Core Interface Object 808 on core 310. In this example, all of the credits distributed for core 310 may be in use and cache management process 10 may fetch at least one additional credit of the one or more additional credits (e.g., additional credits 812) from RAID Manager Interface Object (e.g., RAID Manager Interface Object 800). In this example, three additional credits (e.g., additional credits 812) may be distributed and/or allocated to Core Interface Object 808 on core 310.

Figure 6:
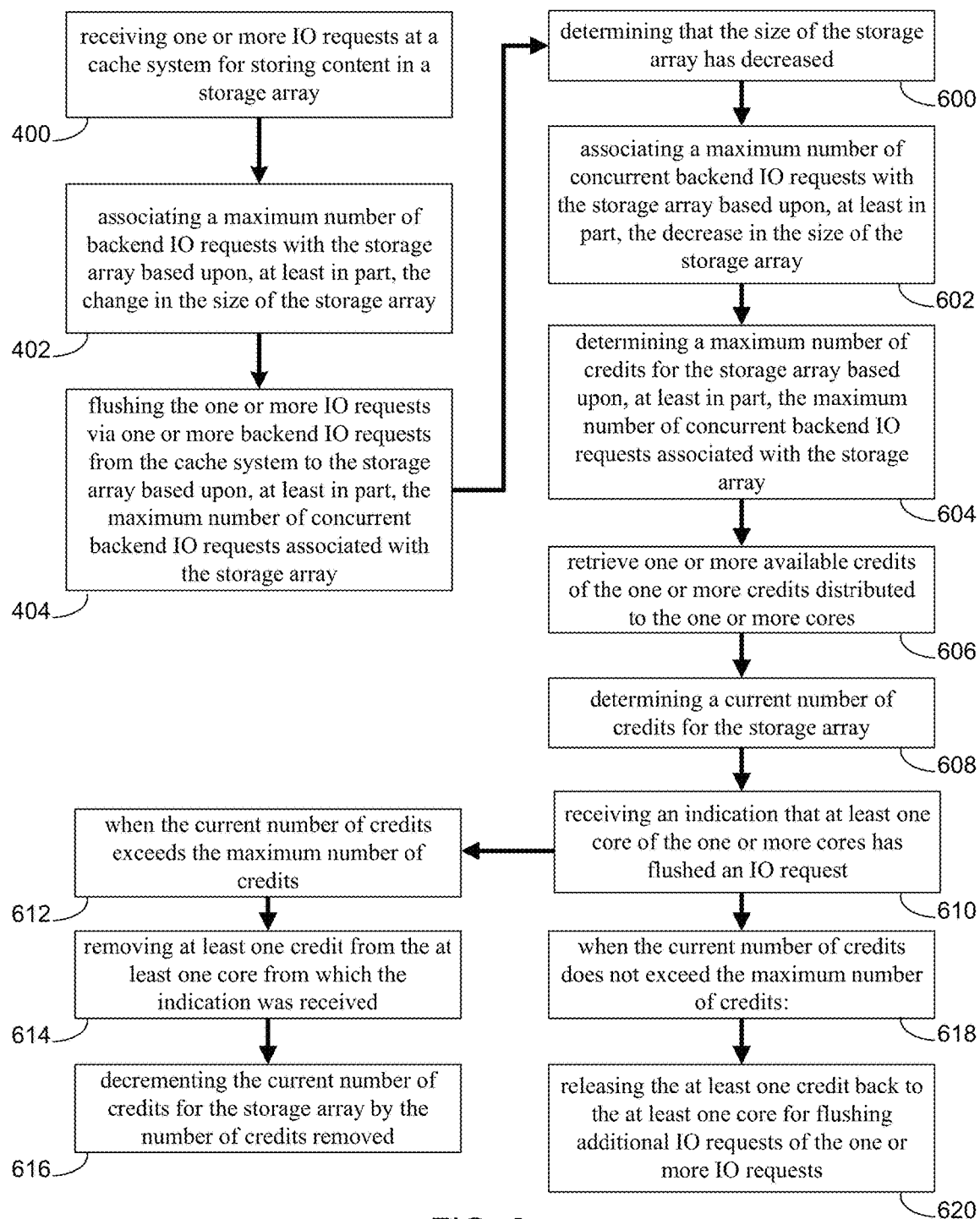
FIG. 6 is another example flowchart of a cache management process according to one or more example implementations of the disclosure.

Referring also to the example implementation of FIG. 6, in some implementations, cache management process 10 may determine 600 that the size of the storage array has decreased. In some implementations where the size of the storage array is decreased, (e.g., by shrinking RAID group 226, 228, 230), the number of concurrent BEIO requests flushed to the storage array may be reduced to prevent the storage array from becoming overloaded.

Figure 11:
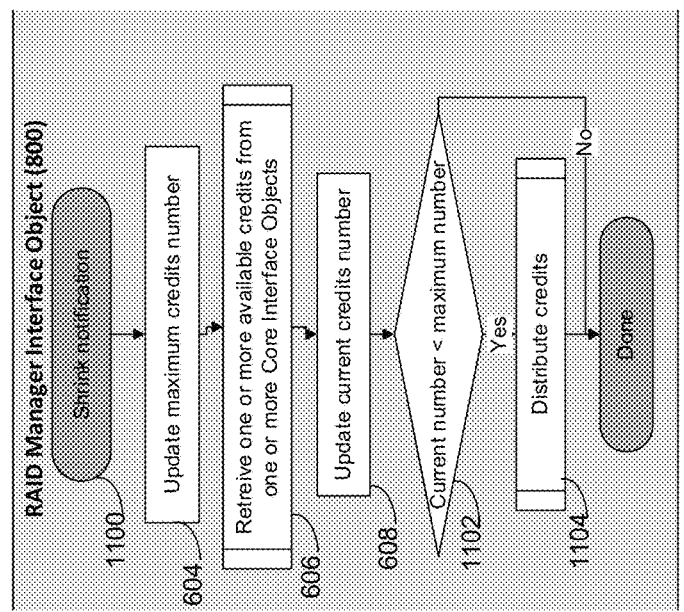
FIG. 11 is another example flowchart of a cache management process according to one or more example implementations of the disclosure.

Referring also to the example implementation of FIG. 11, in some implementations, cache management process 10 may associate 602 a maximum number of concurrent backend IO requests with the storage array based upon, at least in part, the decrease in the size of the storage array. In some implementations, cache system 248 may subscribe (e.g., via core management process 10) to a storage array shrink notification 1100. In some implementations, cache management process 10 may use the second interface of the one or more interfaces between the one or more cache systems and the one or more RAID managers described above to subscribe to the notification. In some implementations, cache management process 10 may send an IOCTL IRP down to RAID manager. As discussed above, RAID manager may not complete this IRP immediately but may complete the IRP after RAID manager 300 determines (e.g., via core management process 10) that the size of storage array has changed.

In some implementations and in response to the shrink notification, cache management process 10 may determine and/or update 604 a maximum number of credits for the storage array based upon, at least in part, the maximum number of concurrent backend IO requests associated with the storage array. After receiving the completion of the IRP, cache management process 10 may retrieve the new credits count (e.g., revised maximum number of backend IO requests associated with the storage array based upon the change in size of the storage array) from RAID manager 300.

In some implementations, cache management process 10 may retrieve 606 one or more available credits of the one or more credits distributed to the one or more cores and may determine and/or update 608 a current number of credits for the storage array. In some implementations, cache management process 10 may set the current number of credits to be the number of credits in use by the one or more cores. Cache management process 10 may compare 1102 the maximum number of credits to the current number of credits. If the maximum number of credits is greater than the current number of credits, cache management process 10 may distribute 1104 one or more available credits to the one or more Core Interface Objects.

Figure 12:
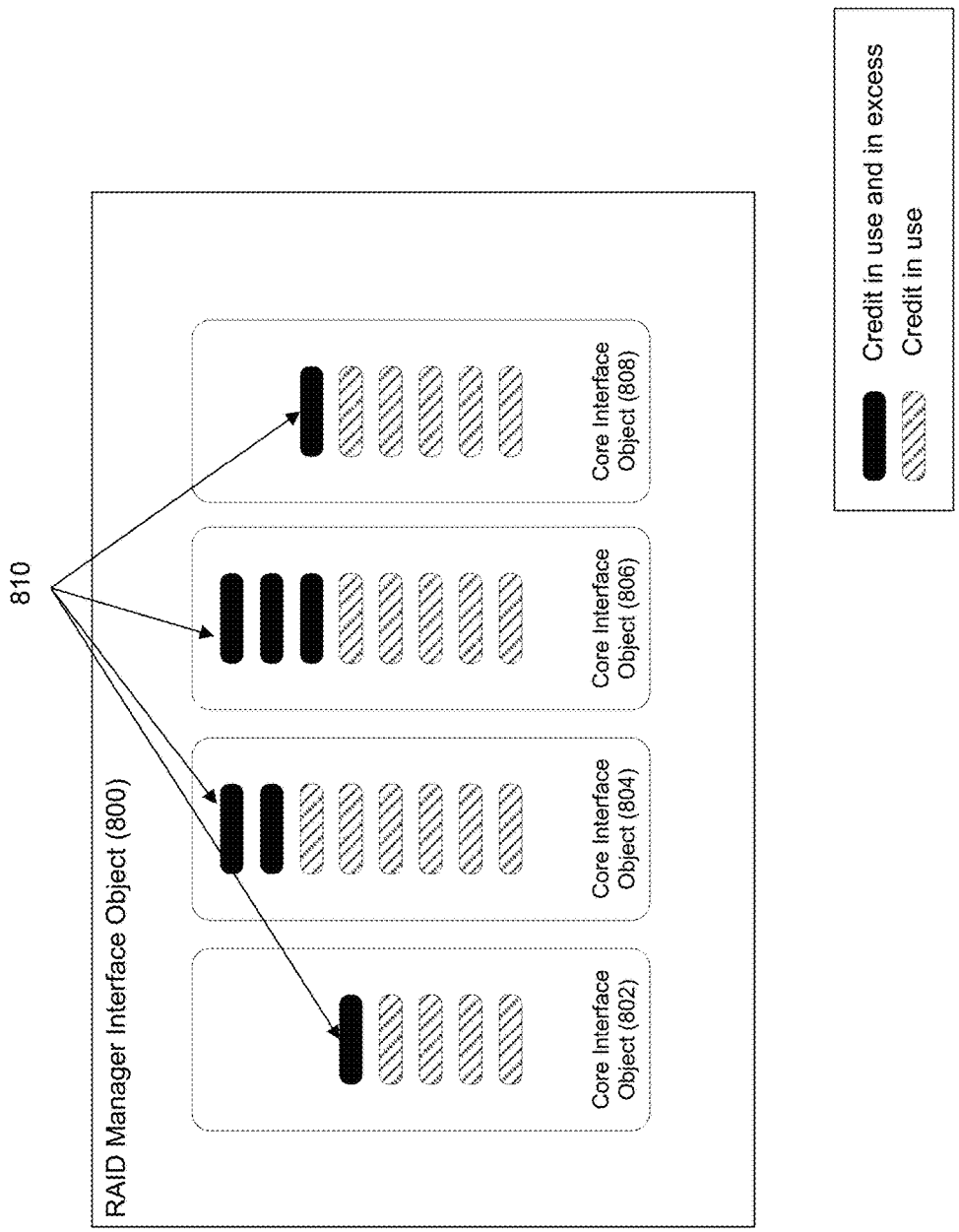
FIG. 12 is another example diagrammatic view of the storage system according to one or more example implementations of the disclosure.
Figure 13:
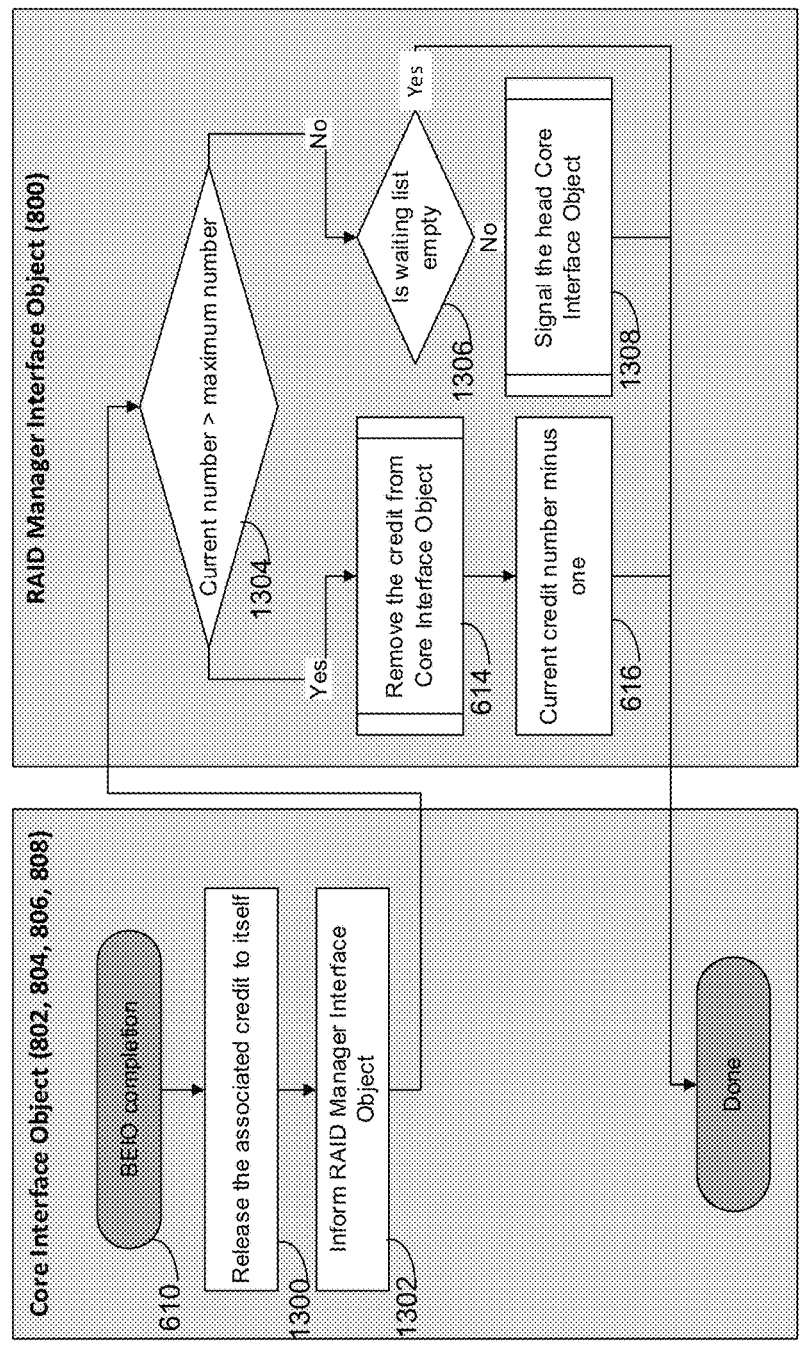
FIG. 13 another example flowchart of a cache management process according to one or more example implementations of the disclosure.

Referring also to the example implementations FIGS. 12-13, in some implementations, cache management process 10 may receive 610 an indication that at least one core of the one or more cores has flushed an IO request. In some implementations, cache management process 10 may release 1300 the credit associated with the flushed IO request to the core from which the indication was received. Cache management process 10 may inform 1302 the RAID Manager Interface Object that a credit has been released. Cache management process 10 may determine 1304 whether the current number of credits exceeds the maximum number of credits. When the current number of credits exceeds the maximum number of credits 612, cache management process 10 may remove 614 at least one credit from the at least one core from which the indication was received and decrement 616 the current number of credits for the storage array by the number of credits removed. In the example implementation of FIG. 12, the one or more credits determined to be in use and in excess may be removed 614 when the indication of the flushed BEIO is received 610 and/or when the flushing of the BEIO is completed.

In some implementations, when the current number of credits does not exceed the maximum number of credits 618, cache management process 10 may release 620 the credit back to the at least one core for flushing additional IO requests of the one or more IO requests. In some implementations, cache management process 10 may determine 1306 if the waiting list (e.g., waiting list 814) is empty. If the waiting list (e.g., waiting list 814) is not empty, RAID Manager Interface Object 800 may (e.g., via cache management process 10) signal 1308 the Core Interface Object on the head of the list. The Core Interface Object being signaled may request (e.g., via cache management process 10) the credit from RAID Manager Interface Object (e.g., RAID Manager Interface Object 800) as discussed above. In some implementations, the Core Interface Object (e.g., Core Interface Objects 802, 804, 806, 808) being signaled may (e.g., via cache management process 10) run on a separate core from the core on which the BEIO completion process is running. Accordingly, cache management process 10 may not block the BEIO's completion and may reduce the running time coupling between Core Interface Objects (e.g., Core Interface Objects 802, 804, 806, 808). If the waiting list is empty, the at least one core may retain (e.g., via cache management process 10) the credit for flushing additional IO requests of the one or more IO requests General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving, at the computing device, one or more input/output (IO) requests at a cache system for storing content in a storage array;
   associating a maximum number of concurrent backend IO requests with the storage array based upon, at least in part, a change in size of the storage array;

flushing the one or more IO requests via one or more backend IO requests from the cache system to the storage array based upon, at least in part, the maximum number of concurrent backend IO requests associated with the storage array, wherein the one or more backend IO requests are flushed from the cache system via one or more cores of one or more multi-core processors, wherein flushing the one or more IO requests via the one or more backend IO requests from the cache system to the storage array is performed on at least one core independent of the other cores of the one or more cores of one or more multi-core processors;

determining that the size of the storage array has increased;

associating a revised maximum number of concurrent backend IO requests with the storage array based upon, at least in part, the increase in the size of the storage array;

managing the storage array via one or more core interface objects between the cache system and one or more RAID managers, wherein the one or more RAID Managers includes at least one RAID Manager interface object;

generating, via the computing device, one or more credits for the storage array, wherein a first core interface object of the one or more core interface objects includes a first request packet configured to fetch the one or more credits for the storage array, and wherein a second core interface object of the one or more core interface objects includes a second request packet configured to determine, via the one or more RAID Managers, when the change in the size of the storage array occurs, wherein the one or more core interface objects are inserted into a waiting list in an order of priority, such that the one or more core interface objects with a high priority request are notified first when the one or more credits become available;

executing the first request packet to effectuate calculating, via the one or more RAID Managers, a total number of credits in the storage array from the one or more credits generated for the storage array; and distributing, via the computing device, the one or more credits to the at least one RAID Manager interface object based upon, at least in part, the total number of credits in the storage array calculated by the one or more RAID Managers.

2. The computer-implemented method of claim 1, further comprising:

generating the one or more credits for the storage array based upon, at least in part, the maximum number of concurrent backend IO requests associated with the storage array, wherein the one or more credits represents one or more concurrent backend IO requests;

distributing, via the computing device, the one or more credits to at least one core of the one or more cores; and flushing at least one IO request of the one or more IO requests via at least one concurrent backend IO request of the one or more concurrent backend IO requests from the at least one core based upon, at least in part, the one or more credits distributed to the at least one core.

3. The computer-implemented method of claim 2, further comprising:

generating, via the computing device, one or more additional credits based upon, at least in part, the maximum number of concurrent backend IO requests associated with the storage array;

receiving a request, at the computing device, from at least one core of the one or more cores, for at least one additional credit from at least one core of the one or more cores; and upon receiving the request for the at least one additional credit, distributing the at least one additional credit of the one or more additional credits to the at least one core of the one or more cores.

4. The computer-implemented method of claim 2, further comprising:

determining that the size of the storage array has decreased;

associating the maximum number of concurrent backend IO requests with the storage array based upon, at least in part, the decrease in the size of the storage array;

determining a maximum number of credits for the storage array based upon, at least in part, the maximum number of concurrent backend IO requests associated with the storage array;

determining a current number of credits for the storage array;

receiving an indication that at least one core of the one or more cores has flushed an IO request;

when the current number of credits exceeds the maximum number of credits:

removing at least one credit from the at least one core from which the indication was received, and decrementing the current number of credits for the storage array by the number of credits removed;

when the current number of credits does not exceed the maximum number of credits:

releasing the at least one credit back to the at least one core for flushing additional IO requests of the one or more IO requests.

5. The computer-implemented method of claim 2, further comprising:

releasing, via the computing device, at least one credit back to at least one core of the one or more cores for flushing additional IO requests of the one or more IO requests.

6. The computer-implemented method of claim 2, further comprising:

receiving a request from at least one core of the one or more cores for an additional credit when the at least one core has an insufficient number of credits to flush one or more IO requests; and returning, via the computing device, the additional credit to the at least one core from another core of the one or more cores.

7. The computer-implemented method of claim 1 wherein the maximum number of concurrent backend IO requests associated with the storage array are determined by multiplying a total number of a plurality of storage targets in the storage array by a queue depth associated with a type of storage target respective to the plurality of storage targets.

8. The computer-implemented method of claim 1 wherein the first request packet is an input/output control (IOCTL) IO request packet (IRP).

9. The computer-implemented method of claim 1 wherein the second request packet is an input/output control (IOCTL) IO request packet (IRP).

10. The computer-implemented method of claim 1, further comprising:

distributing, via the at least one RAID Manager interface object, the one or more credits from the at least one RAID Manager interface object to the at least the first core interface object of the one or more core interface objects.

11. The computer-implemented method of claim 10, wherein distributing the one or more credits to the at least the first core interface object of the one or more core interface objects includes evenly distributing of the one or more credits to the one or more core interface objects such that remaining credits that are unallocated after evenly distributing the one or more credits are kept in the at least one RAID Manager interface object.

12. A computer program product residing on a non-transitory computer readable medium having a plurality of instructions stored thereon which, when executed by a processor, cause the processor to perform operations comprising:
receiving one or more input/output (IO) requests at a cache system for storing content in a storage array;
associating a maximum number of concurrent backend IO requests with the storage array based upon, at least in part, a change in size of the storage array;
flushing the one or more IO requests via one or more backend IO requests from the cache system to the storage array based upon, at least in part, the maximum number of concurrent backend IO requests associated with the storage array, wherein the one or more backend IO requests are flushed from the cache system via one or more cores of one or more multi-core processors, wherein flushing the one or more IO requests via the one or more backend IO requests from the cache system to the storage array is performed on at least one core independent of the other cores of the one or more cores of one or more multi-core processors;
determining that the size of the storage array has increased;
associating a revised maximum number of concurrent backend IO requests with the storage array based upon, at least in part, the increase in the size of the storage array;
managing the storage array via one or more core interface objects between the cache system and one or more RAID managers, wherein the one or more RAID Managers includes at least one RAID Manager interface object;
generating, via the computing device, one or more credits for the storage array, wherein a first core interface object of the one or more core interface objects includes a first request packet configured to fetch the one or more credits for the storage array, and wherein a second core interface object of the one or more core interface objects includes a second request packet configured to determine, via the one or more RAID Managers, when the change in the size of the storage array occurs, wherein the one or more core interface objects are inserted into a waiting list in an order of priority, such that the one or more core interface objects with a high priority request are notified first when the one or more credits become available;
executing the first request packet to effectuate calculating, via the one or more RAID Managers, a total number of credits in the storage array from the one or more credits generated for the storage array; and
distributing, via the computing device, the one or more credits to the at least one RAID Manager interface object based upon, at least in part, the total number of credits in the storage array calculated by the one or more RAID Managers.

13. The computer program product of claim 12, further comprising instructions for:
generating the one or more credits for the storage array based upon, at least in part, the maximum number of concurrent backend IO requests associated with the storage array, wherein the one or more credits represents one or more concurrent backend IO requests;
distributing the one or more credits to at least one core of the one or more cores; and
flushing at least one IO request of the one or more IO requests via at least one concurrent backend IO request of the one or more concurrent backend IO requests from the at least one core based upon, at least in part, the one or more credits distributed to the at least one core.

14. The computer program product of claim 13, further comprising instructions for:
generating, via the computing device, one or more additional credits based upon, at least in part, the maximum number of concurrent backend IO requests associated with the storage array;
receiving a request, at the computing device, from at least one core of the one or more cores, for at least one additional credit; and
upon receiving the request for the at least one additional credit, distributing the at least one additional credit of the one or more additional credits to the at least one core of the one or more cores.

15. The computer program product of claim 13, further comprising instructions for:
determining that the size of the storage array has decreased;
associating the maximum number of concurrent backend IO requests with the storage array based upon, at least in part, the decrease in the size of the storage array;
determining a maximum number of credits for the storage array based upon, at least in part, the maximum number of concurrent backend IO requests associated with the storage array;
determining a current number of credits for the storage array;
receiving an indication that at least one core of the one or more cores has flushed an IO request;
when the current number of credits exceeds the maximum number of credits:
removing at least one credit from the at least one core from which the indication was received, and
decrementing the current number of credits for the storage array by the number of credits removed;
when the current number of credits does not exceed the maximum number of credits:
releasing the at least one credit back to the at least one core for flushing additional IO requests of the one or more IO requests.

16. The computer program product of claim 13, further comprising instructions for:
releasing, via the computing device, at least one credit back to at least core of the one or more cores for flushing additional IO requests of the one or more IO requests.

17. The computer program product of claim 13, further comprising instructions for:
receiving a request from at least one core of the one or more cores for an additional credit when the at least one core has an insufficient number of credits to flush one or more IO requests; and returning, via the computing device, the additional credit to the at least one core from another core of the one or more cores.

18. A computing system including a processor and memory configured to perform operations comprising:
receiving one or more input/output (IO) requests at a cache system for storing content in a storage array;
associating a maximum number of concurrent backend IO requests with the storage array based upon, at least in part, a change in size of the storage array;
flushing the one or more IO requests via one or more backend IO requests from the cache system to the storage array based upon, at least in part, the maximum number of concurrent backend IO requests associated with the storage array, wherein the one or more backend IO requests are flushed from the cache system via one or more cores of one or more multi-core processors, wherein flushing the one or more IO requests via the one or more backend IO requests from the cache system to the storage array is performed on at least one core independent of the other cores of the one or more cores of one or more multi-core processors;
determining that the size of the storage array has increased;
associating a revised maximum number of concurrent backend IO requests with the storage array based upon, at least in part, the increase in the size of the storage array;
managing the storage array via one or more core interface objects between the cache system and one or more RAID managers, wherein the one or more RAID Managers includes at least one RAID Manager interface object;
generating, via the computing device, one or more credits for the storage array, wherein a first core interface object of the one or more core interface objects includes a first request packet configured to fetch the one or more credits for the storage array, and wherein a second core interface object of the one or more core interface objects includes a second request packet configured to determine, via the one or more RAID Managers, when the change in the size of the storage array occurs, wherein the one or more core interface objects are inserted into a waiting list in an order of priority, such that the one or more core interface objects with a high priority request are notified first when the one or more credits become available;
executing the first request packet to effectuate calculating, via the one or more RAID Managers, a total number of credits in the storage array from the one or more credits generated for the storage array; and
distributing, via the computing device, the one or more credits to the at least one RAID Manager interface object based upon, at least in part, the total number of credits in the storage array calculated by the one or more RAID Managers.

19. The computing system of claim 18, further configured to perform operations comprising:
generating the one or more credits for the storage array based upon, at least in part, the maximum number of concurrent backend IO requests associated with the storage array, wherein the one or more credits represents one or more concurrent backend IO requests;
distributing the one or more credits to at least one core of the one or more cores; and
flushing at least one IO request of the one or more IO requests via at least one concurrent backend IO request of the one or more concurrent backend IO requests from the at least one core based upon, at least in part, the one or more credits distributed to the at least one core.

20. The computing system of claim 19, further configured to perform operations comprising:
generating, via the computing device, one or more additional credits based upon, at least in part, the maximum number of concurrent backend IO requests associated with the storage array;
receiving a request, at the computing device, from at least one core of the one or more cores, for at least one additional credit; and
upon receiving the request for the at least one additional credit, distributing the at least one additional credit of the one or more additional credits to the at least one core of the one or more cores.

21. The computing system of claim 19, further configured to perform operations comprising:
determining that the size of the storage array has decreased;
associating the maximum number of concurrent backend IO requests with the storage array based upon, at least in part, the decrease in the size of the storage array;
determining a maximum number of credits for the storage array based upon, at least in part, the maximum number of concurrent backend IO requests associated with the storage array;
determining a current number of credits for the storage array;
receiving an indication that at least one core of the one or more cores has flushed an IO request;
when the current number of credits exceeds the maximum number of credits:
removing at least one credit from the at least one core from which the indication was received, and
decrementing the current number of credits for the storage array by the number of credits removed;
when the current number of credits does not exceed the maximum number of credits:
releasing the at least one credit back to the at least one core for flushing additional IO requests of the one or more IO requests.

22. The computing system of claim 19, further comprising instructions for:
receiving a request from at least one core of the one or more cores for an additional credit when the at least one core has an insufficient number of credits to flush one or more IO requests; and
returning, via the computing device, the additional credit to the at least one core from another core of the one or more cores.

* * * * *